H. BRADFORD.
Feeding Devices for Coal and Ore Separators.
No. 143,323. Patented September 30, 1873.
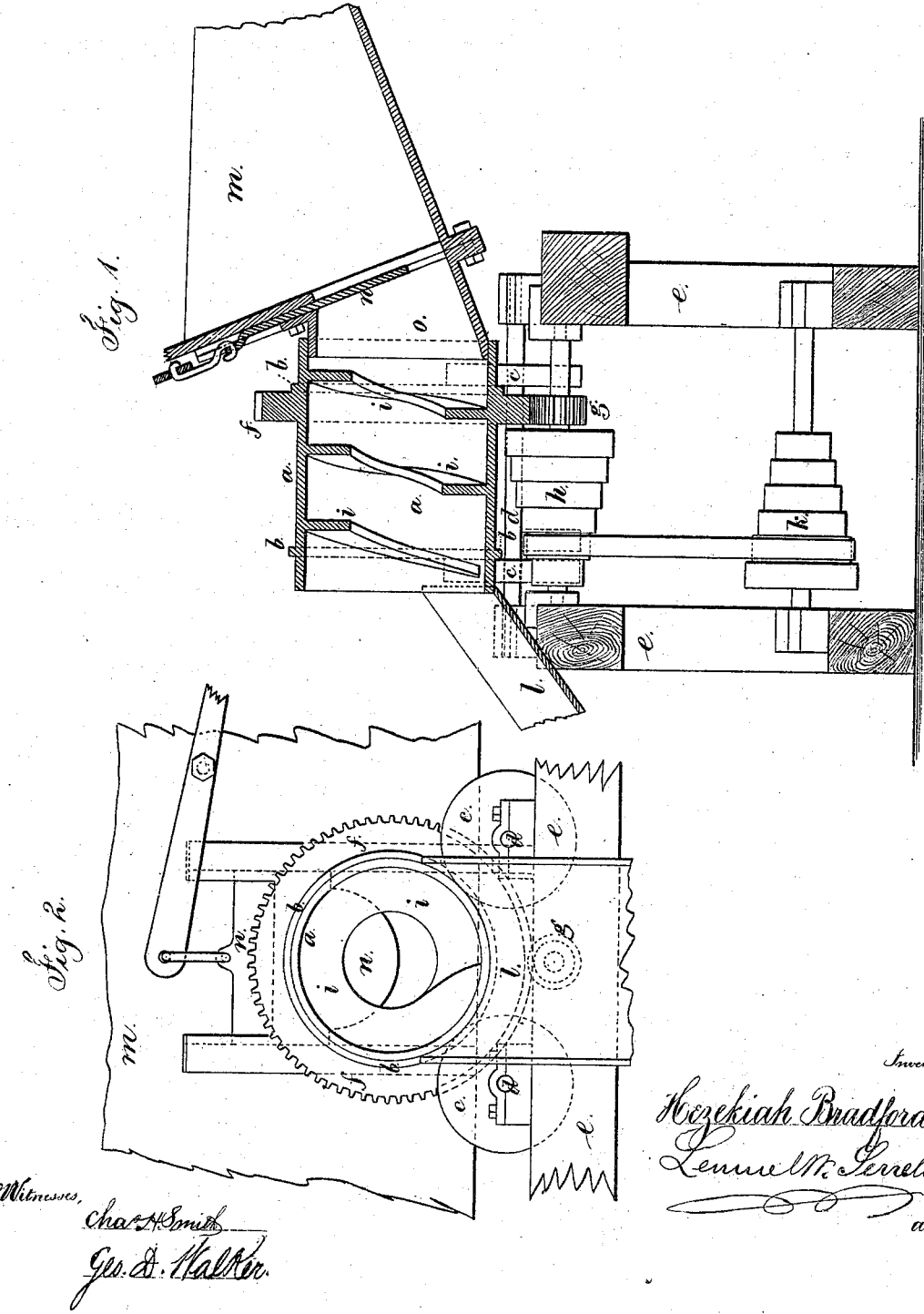

UNITED STATES PATENT OFFICE.

HEZEKIAH BRADFORD, OF READING, PENNSYLVANIA.

IMPROVEMENT IN FEEDING DEVICES FOR COAL AND ORE SEPARATORS.

Specification forming part of Letters Patent No. 143,323, dated September 30, 1873; application filed March 25, 1873.

*To all whom it may concern:*

Be it known that I, HEZEKIAH BRADFORD, of Reading, in the State of Pennsylvania, have invented an Improvement in Feeding Device for Coal and Ore Separators, &c., of which the following is a specification:

An ore-separator was patented by me June 29, 1858, and extended, and subsequent improvements have been made by me. In these separators for coal, ore, &c., it is important that the material to be separated shall pass into the jig with great uniformity and regardless of the quantity of coal in the hopper or receptacle from which it is supplied.

My present invention is made to effect uniformity in the delivery of material from a hopper; and consists in a cylinder mounted upon rollers and containing an internal worm or screw, which cylinder is revolved at a regular speed and receives the coal or other material from the hopper and conveys it to the chute or slide leading to the separator. A gate is employed to regulate the height of the material that runs into the cylinder and banks between the convolutions of the screw.

In the drawing, Figure 1 is a vertical section longitudinally of the screw-cylinder, and Fig. 2 is an elevation of the same.

The cylinder $a$ is made with ring-flanges $b\ b$, forming guides against the supporting-wheels $c\ c$, that are upon shafts $d$ in boxes upon the frame $e$. $f$ is a ring-formed gear-wheel surrounding the cylinder $a$, and $g$ is a pinion for revolving the same. The cones of pulleys $h\ k$ and belt serve to regulate the speed of rotation from any competent prime mover. One or two rollers might be applied above the cylinder $a$, to prevent the same being lifted from any cause. At the delivery end of the cylinder $a$ is the chute or conveyer $l$, that extends to the separating apparatus. The coal or other material is contained in a hopper, $m$, and in the side thereof is an opening at which a slide, $n$, is affixed, that is provided with a lever or other means for opening or closing the same more or less. The mouth $o$ is of a size to enter freely within the end of the cylinder $a$, and it connects the same with the hopper $m$.

It will now be evident that, according to the height to which the slide $n$ is raised, so the coal will run down and form in the cylinder $a$ a bank of greater or less thickness, and that, as this cylinder $a$ is revolved, the screw-blades $i$ within the same will cause the coal or other material to be moved along through the cylinder and delivered. The speed of delivery will be regulated by the height to which the slide $n$ is raised and the speed with which the cylinder $a$ is revolved.

The movement of the cylinder $a$ and its screw $i$ is such that the coal or other material is constantly agitated at or directly below the delivery-mouth of the hopper; and hence there is not any risk of the same becoming stopped either in the mouth $o$ or in the hopper.

The end of the screw $i$ is made inclined, as shown in Fig. 2, so as to lift any large or long substance above the screw at the receiving end and prevent its wedging between the blades or plates of the screw and insure its final delivery.

The screw $i$ in the cylinder may be a single blade, or two or more blades may be employed, or plates at an inclination may take the place of the screw-blades. In any instance, the parts are to be constructed and proportioned with reference to the speed of revolution of the cylinder, the size and character of the pieces of material operated on, and the quantity to be delivered.

It is important to place the hopper as close to the end of the cylinder as possible, to lessen the risk of the material clogging at the outlet of the hopper; and it will be apparent that the gate $n$ may be moved vertically, horizontally, or at an inclination, as shown.

This construction of feeder allows large pieces of material and foreign substances to pass through freely, whereas in the feeders heretofore constructed there is risk of obstruction by nails, chisel-points, &c., and they are more easily clogged by large pieces of material.

I claim as my invention—

1. The cylinder $a$ and its internal screw or blades $i$, supported by the rollers or wheels $c$ and revolved in combination with the mouth $o$ or delivery-opening of the hopper $m$, substantially as set forth.

2. The combination of the slide $n$, delivery-mouth $o$, and hopper $m$ with the cylinder $a$ and feeding-screw or blades $i$, substantially as and for the purposes set forth.

3. A revolving cylinder containing a screw or inclined blades interposed between the mouth of a hopper and a delivery-incline, substantially as set forth, to regulate the delivery of material from said hopper.

Signed by me this 21st day of March, A. D. 1873.

HEZEKIAH BRADFORD.

Witnesses:
GEO. T. PINCKNEY,
CHAS. H. SMITH.